United States Patent
Watanabe

(10) Patent No.: US 6,738,359 B1
(45) Date of Patent: May 18, 2004

(54) COMMUNICATION FORMAT CONTROL METHOD AND APPARATUS

(75) Inventor: Keizo Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/498,871

(22) Filed: Feb. 7, 2000

(30) Foreign Application Priority Data

Mar. 15, 1999 (JP) .......................................... 11-068833

(51) Int. Cl.[7] ................................................. H04L 5/16
(52) U.S. Cl. ....................................................... 370/296
(58) Field of Search ................................. 370/277, 278, 370/279, 280, 281, 293, 294, 295, 296, 331, 328, 329

(56) References Cited

U.S. PATENT DOCUMENTS 4,672,601 A * 6/1987 Ablay ......................... 370/277
4,821,310 A * 4/1989 Lynk et al. .................. 455/517
5,881,370 A * 3/1999 Pottala et al. ................ 455/78
6,466,551 B2 * 10/2002 Sakai et al. ................. 370/296

FOREIGN PATENT DOCUMENTS

JP          3-224396       * 10/1991

* cited by examiner

*Primary Examiner*—Min Jung
(74) *Attorney, Agent, or Firm*—Katten Muchin Zavis Rosenman

(57) ABSTRACT

A communication format control method is used in a mobile communication system which is capable of providing a communication service to a mobile station in each zone via a plurality of base stations by a simplex or duplex communication format. The communication format control method includes a step of call-connecting a calling mobile station which calls by a simplex communication request and a called mobile station by a duplex communication format, when the calling mobile station is located in a zone different from a zone in which the called mobile station is located.

7 Claims, 18 Drawing Sheets

FIG. 2

| |
|---|
| PROTOCAL IDENTIFIER |
| CALLING NO./ADDED SERVICE IDENTIFIER |
| MESSAGE IDENTIFIER |
| TRANSMISSION CAPACITY |
| CHANNEL IDENTIFIER |
| FACILITY |
| OPERATION IDENTIFIER |
| DISPLAY |
| KEYPAD FACILITY |
| SIGNAL |
| FEATURE INDICATION |
| CALL NO. |
| CALL SUB ADDRESS (1ST) |
| CALLED NO. |
| CALLED SUB ADDRESS (1ST) |
| HIGH LAYER MATCHING |
| USER · USER |
| FIXED SHIFT (CODE GROUP 6) |
| CALL SUB ADDRESS (2ND) |
| CALLED SUB ADDRESS (2ND) |

FIG. 3A

| BITS | 8 | 7 | 6 | 5 | 4 | 3 | 2 | 1 | OCTET |
|---|---|---|---|---|---|---|---|---|---|
| | 0 | 0 | 0 | TRANSMISSION CAPACITY<br>0  0  1  0  0<br>INFORMATION ELEMENT IDENTIFIER | | | | | 1 |
| | TRANSMISSION CAPACITY CONTENT LENGTH | | | | | | | | 2 |
| | 1<br>EXTENDED | CONDING STANDARD | | | INFORMATION TRANSFER CAPACITY | | | | 3 |
| | 0/1<br>EXTENDED | TRANSFER MODE | | | INFORMATION TRANSFER SPEED | | | | 4 |
| | 0/1<br>EXTENDED | STRUCTURE | | | COMMUNICATION FORMAT | | CALL SETUP METHOD | | 4 a |
| | 1<br>EXTENDED | SYMMETRY | | | INFORMATION TRANSFER SPEED (FROM CALLED TO CALLER) | | | | 4 b |
| | 0/1<br>EXTENDED | LAYER 1 IDENTIFICATION | | | USER INFORMATION LAYER 1 PROTOCOL | | | | 5 a |
| | 1<br>EXTENDED | SYNC/ASYNC | IN-BAND INTERFERENCE | | USER SPEED | | | | 5 b |

FIG. 3B

| BIT | 4 | 3 | 2 | |
|---|---|---|---|---|
| | 0 | 0 | 0 | : SIMPLEX INDIVIDUAL |
| | 0 | 1 | 0 | : DUPLEX INDIVIDUAL |
| | 1 | 0 | 0 | : GROUP |
| | 1 | 1 | 0 | : BROADCAST |
| | 1 | 1 | 1 | : FORCED SIMULTANEOUS INSTRUCTION |
| | 0 | 0 | 1 | : DEFAULT |

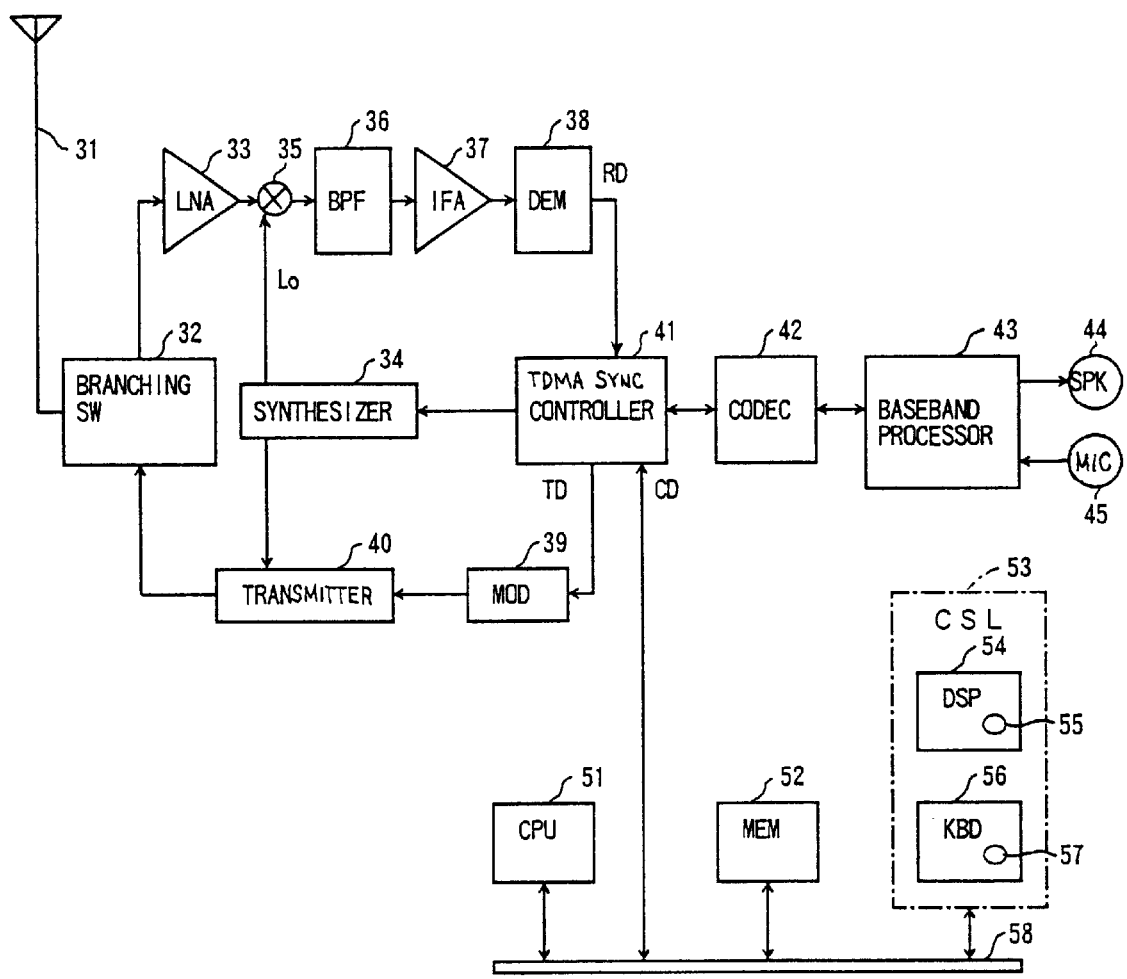
F I G. 1 0

FIG. 11A

| MOBILE STATION | LOCATED ZONE | ~21 |
|---|---|---|
| MS1 | Z1 | |
| MS2 | Z1 | |
| MS3 | Z1 | |
| MS4 | Z2 | |
| ⋮ | | |
| | | |

FIG. 11B

| MOBILE STATION | STATE OF USE | CALL STATE MANAGEMENT TABLE |
|---|---|---|
| MS1 | CALLING | 26A |
| MS2 | CALLED | 26B |
| MS3 | FREE | — |
| MS4 | FREE | — |
| ⋮ | | |

| CALLING TERMINAL | MS1 |
|---|---|
| CALLED TERMINAL | MS2 |
| CALLING MODE | SIMPLEX |
| PRESENT MODE | SIMPLEX |
| USED CHANNEL | TCH1 |
| ⋮ | |

26B

| CALLING TERMINAL | MS1 |
|---|---|
| CALLED TERMINAL | MS2 |
| CALLING MODE | SIMPLEX |
| PRESENT MODE | SIMPLEX |
| USED CHANNEL | TCH1 |
| ⋮ | |

FIG. 17A

| R | P | TCH (FACCH) | SW | I | CC | SACCH (RCH) | TCH (FACCH) | G |
|---|---|---|---|---|---|---|---|---|
| 6 | 2 | 148 | 20 | 2 | 6 | 20 | 108 | 8 |

FIG. 17B

| R | P | TCH (FACCH) | SW | CI | CC | SACCH (RCH) | TCH (FACCH) | B/I |
|---|---|---|---|---|---|---|---|---|
| 6 | 2 | 112 | 20 | 2 | 6 | 20 | 144 | 8 |

FIG. 18A

| SIGNAL NAME | MSB<br>1 | 2 3 4 | 5 6 7 8 | LSB<br>1 2 3 4 5 6 |
|---|---|---|---|---|
| IDLE | 0 | 0 0 0 | RESERVED | RESERVED BITS |
| POWER CONTROL | 0 | 0 0 1 | POW | RESERVED BITS |
| TIME ALIGNMENT INSTRUCTION | 0 | 0 1 0 | TA | RESERVED BITS |
| DOWN SET POWER NOTIFICATION | 0 | 0 1 1 | POW-D | RESERVED BITS |
| LICENSEE ID SIGNAL | 0 | OTHER | OPTION | |
| SPARE | OTHER | | | |

FIG. 18B

| SIGNAL NAME | 1 | 2 3 4 | 5 6 7 8 | 1 2 3 4 5 6 |
|---|---|---|---|---|
| SIMPLEX⟶DUPLEX | 0 | 1 0 0 | 0 0 0 0 | 1 1 1 1 1 1 |
| DUPLEX⟵SIMPLEX | 0 | 1 0 0 | 1 1 1 1 | 0 0 0 0 0 0 |

COMMUNICATION FORMAT CONTROL METHOD AND APPARATUS

BACKGROUND OF THE INVENTION

1. Field of the Invention

The present invention generally relates to communication format control methods and apparatuses, and more particularly to a communication format control method and apparatus for a mobile communication system which is capable of providing simplex and duplex communication services to a mobile station in each zone via a plurality of base stations.

In simplex communication, a person cannot speak while the other person is speaking. However, the communication between the two persons can be made via a single communication channel (traffic channel TCH1up or TCH1down), thereby making it possible to effectively utilize the communication channel (frequency). For this reason, the simplex communication is popularly used in mobile communication systems including independent systems.

2. Description of the Related Art

FIGS. 1 through 7B are diagrams for explaining the prior art, and show various communication phases and the like conforming to a mobile communication standard of Japan.

FIG. 1 is a diagram showing a communication phase of a duplex communication conforming to the standard. In FIG. 1, MS1 and MS2 denote mobile stations, BS denotes a base station, CAC denotes a common access channel, and USC denotes a user specific channel. The common access channel CAC includes a broadcast control channel BCCH, a paging channel PCH, a signaling control channel SCCH, and a user packet channel UPCH.

When the mobile station MS1 calls the mobile station MS2 by a "duplex call setup", the base station BS in response to this "duplex call setup" returns a "call setup accept" to the mobile station MS1 and pages the mobile station MS2 by a "duplex communication".

FIG. 2 is a diagram showing a format of a call setup message conforming to the standard. As shown in FIG. 2, the format includes "transfer capacity" in the fourth column. FIG. 3A is a diagram showing a format of the "transfer capacity" in conformance with the standard. A "communication format" column is located at an octet 4a shown in FIG. 3A. FIG. 3B is a diagram showing a bit coding of the "communication format" in conformance with the standard. In FIG. 3B, "000" indicates simplex communication, and "010" indicates duplex communication.

Returning now to the description of FIG. 2, when the mobile station MS2 returns a "communication enable", the base station BS in response to this "communication enable" sends a synchronizing signal SB1 to the mobile station MS1 by the user specific channel USC, and specifies a radio channel by the common access channel CAC. In response to this specifying of the radio channel, the mobile station MS1 switches the frequency to the specified radio channel, and establishes synchronization with the base station BS by exchanging subsequent synchronizing signals SB1 through SB4. In addition, the base station BS also establishes synchronization with the mobile station MS2 in a similar manner, and calls the mobile station MS2. When a response is received from the mobile station MS2, a duplex communication state is reached between the mobile stations MS1 and MS2.

FIG. 4 is a diagram showing a communication phase of a simplex communication conforming to the standard. When the mobile station MS1 calls the mobile station MS2 by a "simplex call setup", the base station BS in response to this "simplex call setup" returns a "call setup accept" to the mobile station MS1 and pages the mobile station MS2 by a "simplex communication". When the mobile station MS2 returns a "communication enable", the base station BS in response to this "communication enable" sends a synchronizing signal SB1 to the mobile stations MS1 and MS2 for a predetermined time by the user specific channel USC, and specifies a radio channel with respect to the mobile stations MS1 and MS2 by the common access channel CAC. In response to this specifying of the radio channel, the mobile stations MS1 and MS2 switch the frequency to the specified radio channel, and when a traffic channel TCH (B/I=I) is received from the base station BS, the mobile stations MS1 and MS2 assume an enabled state accessible by the simplex communication. Here, B/I denotes busy/idle bits.

In this state, when a press-to-talk of the mobile station MS1 is turned ON, the mobile station MS1 establishes a send synchronization between the mobile station MS1 and the base station BS, and thus, the traffic channel TCH (speech) from the mobile station MS1 is received by the mobile station MS2. When the press-to-talk of the mobile station MS1 is turned OFF, the mobile station MS1 releases the right to send, and the mobile stations MS1 and MS2 again assume the enabled state accessible by the simplex communication. The operation of the mobile station MS2 when the press-to-talk is turned ON is the same as in the case of the mobile station MS1.

FIGS. 5 and 6 are diagrams showing a communicating channel switching phase (re-calling type) of the simplex communication conforming to the standard. FIG. 5 shows a case where the mobile station MS1 which is communicating with the mobile station MS2 via a base station BS1 by a simplex communication moves to another zone during the communication. When the down-level deteriorates, the mobile station MS1 searches for a perch channel, and makes a re-calling during communication by a "simplex communication re-call setup" with respect to a selected base station BS2. Responsive to this "simplex communication re-call setup", the base station BS2 returns a "re-call setup accept" to the mobile station MS1 by the common access channel CAC, sends a synchronizing signal SB1 to the mobile station MS1 by the user specific channel USC, and specifies a radio channel by the common access channel CAC. In response to this specifying of the radio channel, the mobile station MS1 switches the frequency to the specified radio channel, and establishes synchronization with the base station BS2 by exchanging subsequent synchronizing signals SB1 through SB4. When a traffic channel TCH (B/I=B) is received from the base station BS2, the traffic channel TCH (speech) from the mobile station MS1 is continuously received by the mobile station MS2 via the base stations BS2 and BS1.

FIG. 6 is a diagram showing a case where the mobile station MS1 is making a reception. When the down-level deteriorates, the mobile station MS1 searches for a perch channel, and makes a re-calling during reception by a "simplex communication re-call setup" with respect to the selected base station BS2. Responsive to this "simplex communication re-call setup", the base station BS2 returns a "re-call setup accept" to the mobile station MS1 by the common access channel CAC, sends a synchronizing signal SB1 to the mobile station MS1 for a predetermined time by the user specific channel USC, and specifies a radio channel by the common access channel CAC. In response to this specifying of the radio channel, the mobile station MS1 switches the frequency to the specified radio channel, and establishes synchronization with the base station BS1. The traffic channel TCH (speech) from the mobile station MS2 is continuously received by the mobile station MS1 via the base stations BS1 and BS2.

FIGS. 7A and 7B are diagrams for explaining a conventional communication format control method.

FIG. 7A shows a case where a mobile station MS1 in a zone Z1 calls a mobile station MS2 in the same zone Z1 by a simplex communication. In this case, a base station BS1 (that is, a radio line control unit MCU 30) allocates a traffic channel TCH1, for example, with respect to the mobile stations MS1 and MS2 via the common access channel CAC. In this state, when the press-to-talk of the mobile station MS1 is turned ON, the mobile station MS1 establishes a send synchronization with the base station BS1 by the traffic channel TCH1up, and the communication (speech) from the mobile station MS1 is consequently received by the mobile station MS2 via the traffic channel TCH1up, the base station BS1 and the traffic channel TCH1down. When the press-to-talk of the mobile station MS1 is turned OFF, the traffic channel TCH1up is released. Next, when the press-to-talk of the mobile station MS2 is turned ON, the mobile station MS2 establishes a send synchronization with the base station BS1 by the traffic channel TCH1up, and the communication (speech) from the mobile station MS2 is consequently received by the mobile station MS1 via the traffic channel TCH1up, the base station BS1 and the traffic channel TCH1down. When the press-to-talk of the mobile station MS2 is turned OFF, the traffic channel TCH1up is released. Accordingly, although one person cannot speak while the other person is speaking, the simplex communication can be made by use of a single communication channel (traffic channel TCH1up or TCH1down), thereby making it possible to effectively utilize the communication channel (frequency). For this reason, the simplex communication is popularly used in mobile communication systems including independent systems.

FIG. 7B shows a case where the mobile station MS1 in the zone Z1 calls the mobile station MS2 in a different zone Z2 by a simplex communication. In this case, the base station BS1 allocates a traffic channel TCH1 to the mobile station MS1 by the common access channel CAC, and the base station BS2 allocates a traffic channel TCH2 to the mobile station MS2 by the common access channel CAC. In this state, when the press-to-talk of the mobile station MS1 is turned ON, the mobile station MS1 establishes a send synchronization with the base station BS1 by the traffic channel TCH1up, and the communication (speech) from the mobile station MS1 is received by the mobile station MS2 via the traffic channel TCH1up, the base station BS1, the MCU 30, the base station BS2 and the traffic channel TCH2down. However, there was a problem in that the traffic channel TCH1down of the base station BS1 and the traffic channel TCH2up of the base station BS2 are not used in this state.

In addition, when the press-to-talk of the mobile station MS2 is turned ON, the mobile station MS2 establishes a send synchronization wit the base station BS2 by the traffic channel TCH2up. Hence, the communication (speech) from the mobile station MS2 is received by the mobile station MS1 via the traffic channel TCH2up, the base station BS2, the MCU 30, the base station BS1, and the traffic channel TCH1down. However, there was a problem in that the traffic channel TCH2down of the base station BS2 and the traffic channel TCH1up of the base station BS1 are not used in this state.

The above described problems similarly occur when the mobile station MS2 or MS1 which is call-connected by the simplex communication moves from the zone Z1 to the zone Z2 in FIG. 7A during the communication.

SUMMARY OF THE INVENTION

Accordingly, it is a general object of the present invention to provide a novel and useful communication format control method and apparatus, in which the problems described above are eliminated.

Another and more specific object of the present invention is to provide a communication format control method and apparatus which can improve the simplex communication service.

Still another object of the present invention is to provide a communication format control method for a mobile communication system which is capable of providing a communication service to a mobile station in each zone via a plurality of base stations by a simplex or duplex communication format, comprising the steps of call-connecting a calling mobile station which calls by a simplex communication request and a called mobile station by a duplex communication format, when the calling mobile station is located in a zone different from a zone in which the called mobile station is located. According to the communication format control method of the present invention, it is possible to effectively utilize the communication channels which were not utilized conventionally. For example, in the case of the communication from the calling mobile station and the called mobile station, traffic channels TCH1down and TCH2up are effectively utilized by the present invention. In addition, the mobile stations in this case can communicate by the duplex communication, thereby making it possible to greatly improve the communication service which is originally limited to the simplex communication.

A further object of the present invention is to provide a communication format control apparatus for a mobile communication system which is capable of providing a communication service to a mobile station in each zone via a plurality of base stations by a simplex or duplex communication format, comprising a position registration table which records a zone in which each mobile station is located, a call state management table which manages a present communication format and a request mode of the communication format at a time when calling or called, for each mobile station, and a communication format controller which instructs the communication format of each mobile station by referring to each of the position registration table and the call state management table when a mobile station calls or is called or, when the mobile station moves from one zone to another zone during communication, where the communication format controller instructs the duplex communication format if a request mode when the mobile station calls or is called is the simplex communication and two mobile stations in communication are located within mutually different zones. According to the communication format control apparatus of the present invention, it is also possible to effectively utilize the communication channels which were not utilized conventionally.

Another object of the present invention is to provide a mobile station unit for in a mobile communication system which is capable of providing a communication service to a mobile station in each zone via a plurality of base stations by a simplex or duplex communication format, comprising a communication controller which is operable in the simplex and duplex communication formats, a display unit which displays the communication format of an operating mobile station to which the display unit belongs, and a signal sound generator which generates a signal sound to indicate a change of communication format when the communication format changes during communication. According to the mobile station unit of the present invention, the user can appropriately make the intended communication depending on the control of the communication format on the network side.

Other objects and further features of the present invention will be apparent from the following detailed description when read in conjunction with the accompanying drawings.

BRIEF DESCRIPTION OF THE DRAWINGS

FIG. 2 is a diagram showing a format of a call setup message conforming to the standard;

FIGS. 3A and 3B respectively are a diagram showing a format of a "transfer capacity" in conformance with the standard, and a diagram showing a bit coding of a "communication format" in conformance with the standard;

FIG. 10 is a system block diagram showing a digital portable terminal of the embodiment of the communication format control apparatus;

FIGS. 11A through 11C are diagrams for explaining various tables used in the embodiment of the communication format control apparatus;

FIGS. 17A and 17B respectively are diagrams for explaining a signal format of a radio signal used in the embodiment of the communication format control apparatus; and FIGS. 18A and 18B respectively are diagrams for explaining the signal format of the ratio signal used in the embodiment of the communication format control apparatus.

DESCRIPTION OF THE PREFERRED EMBODIMENTS

Figure 1:
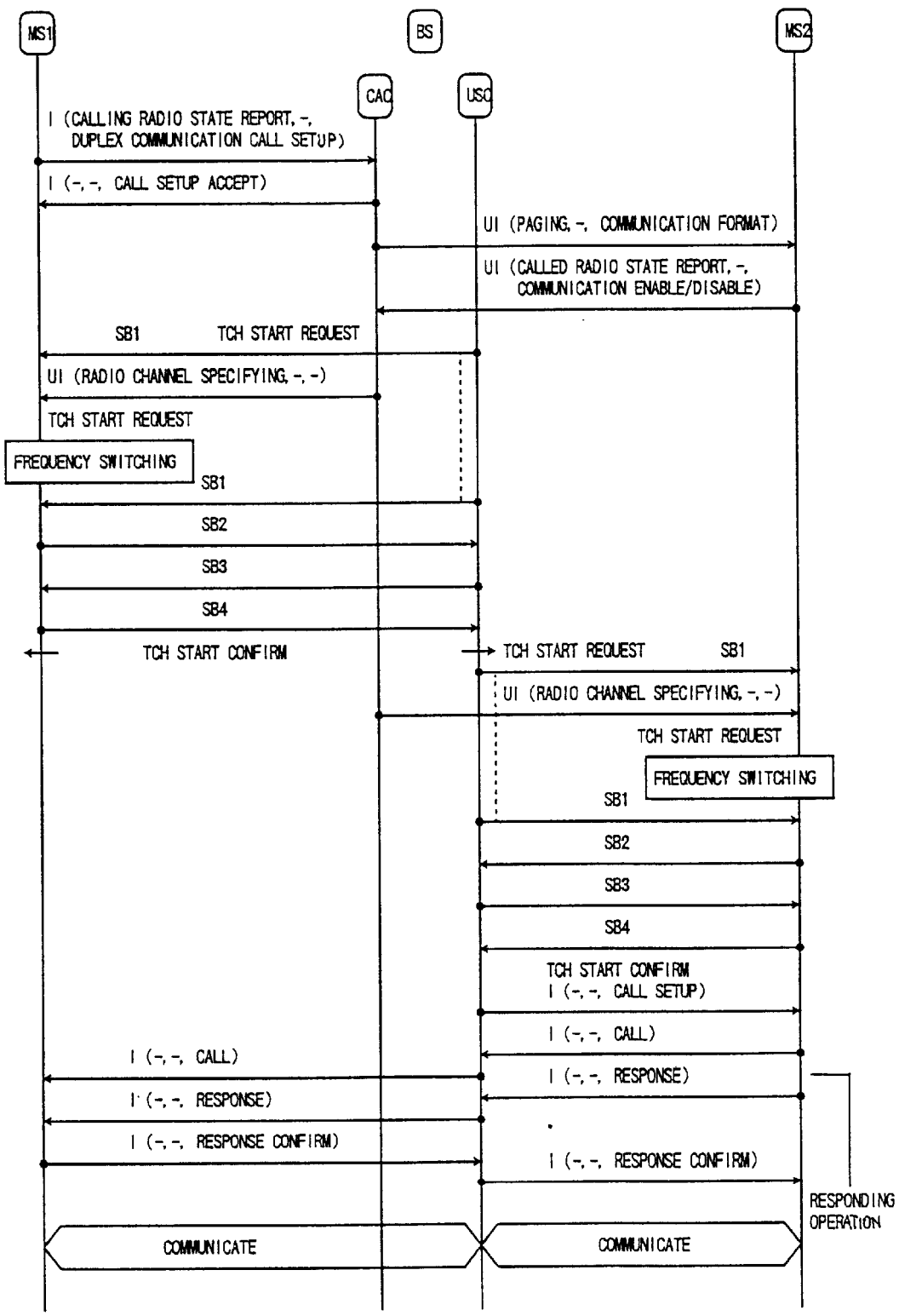
FIG. 1 is a diagram showing a communication phase of a duplex communication conforming to a standard.
Figure 4:
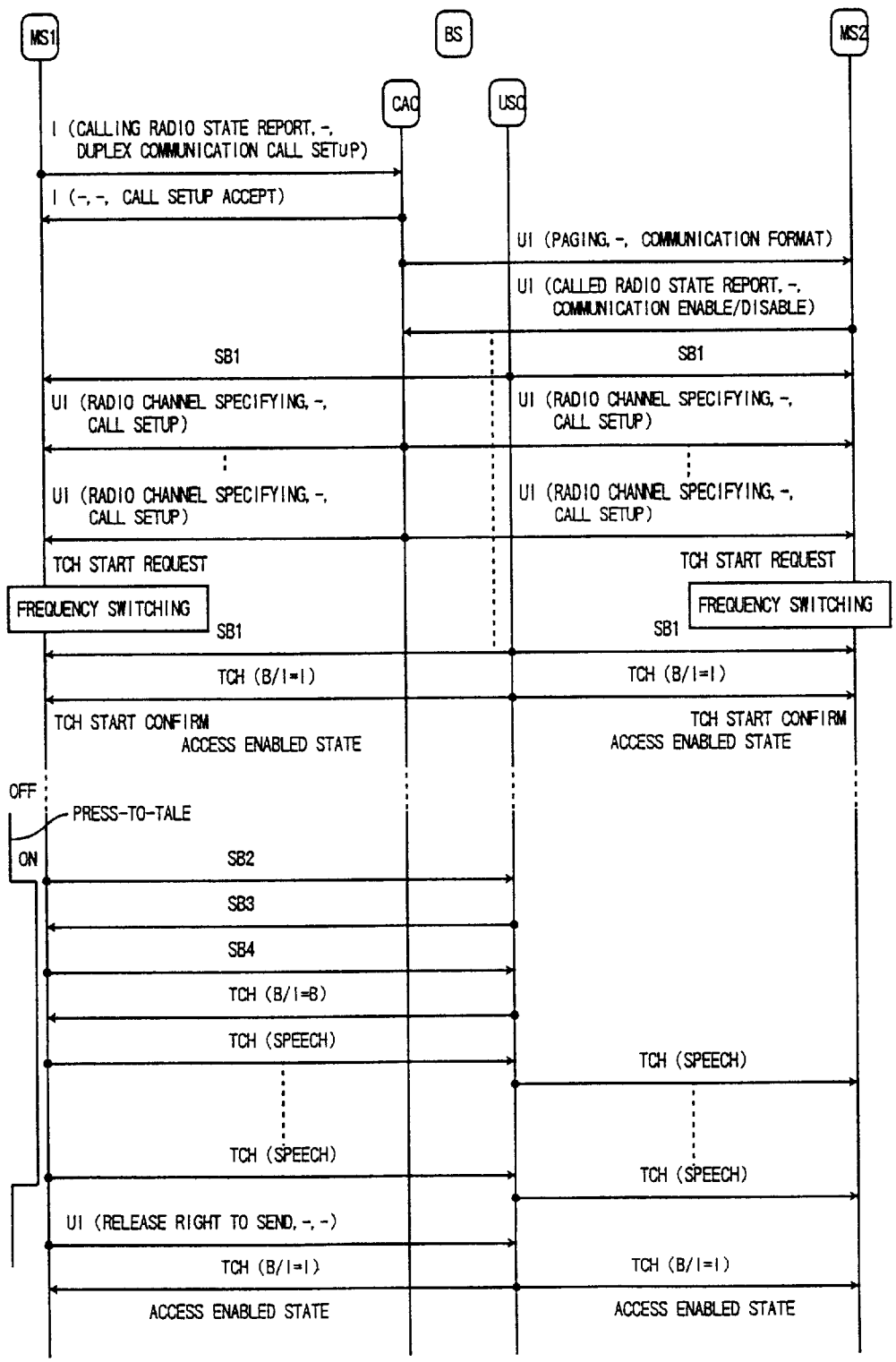
FIG. 4 is a diagram showing a communication phase of a simplex communication conforming to the standard.
Figure 5:
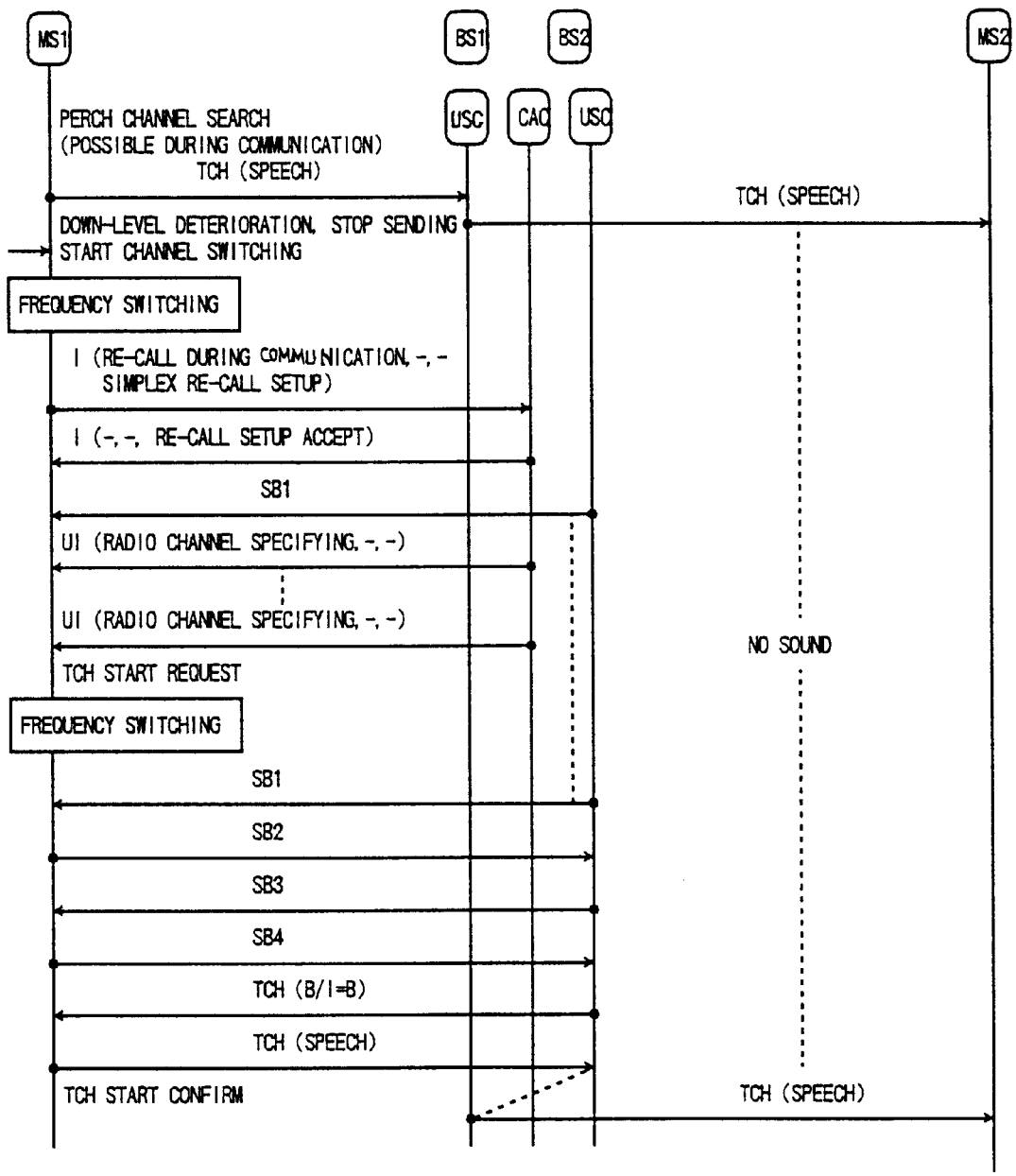
FIG. 5 is a diagram showing a communicating channel switching phase of the simplex communication conforming to the standard.
Figure 6:
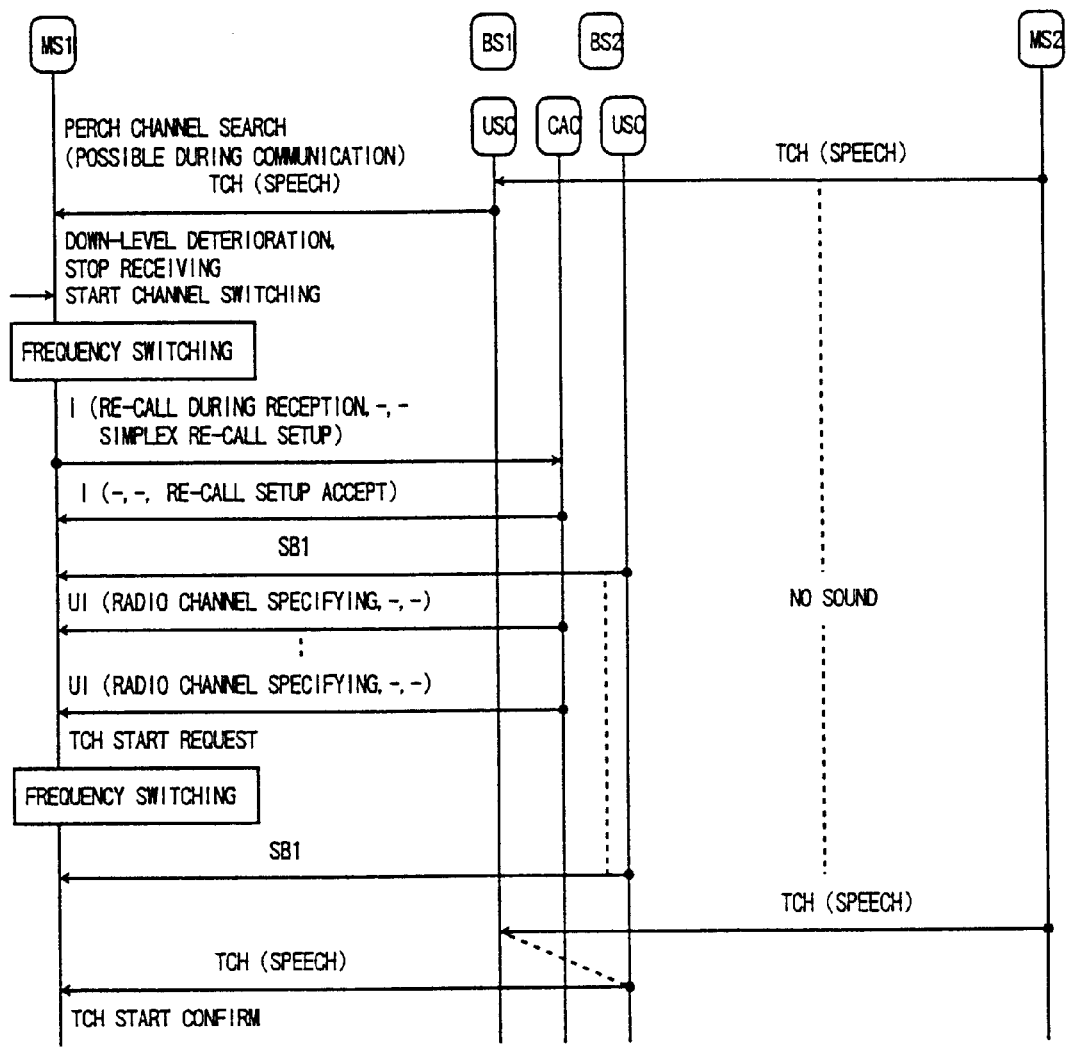
FIG. 6 is a diagram showing a communicating channel switching phase of the simplex communication conforming to the standard.
Figure 7A:
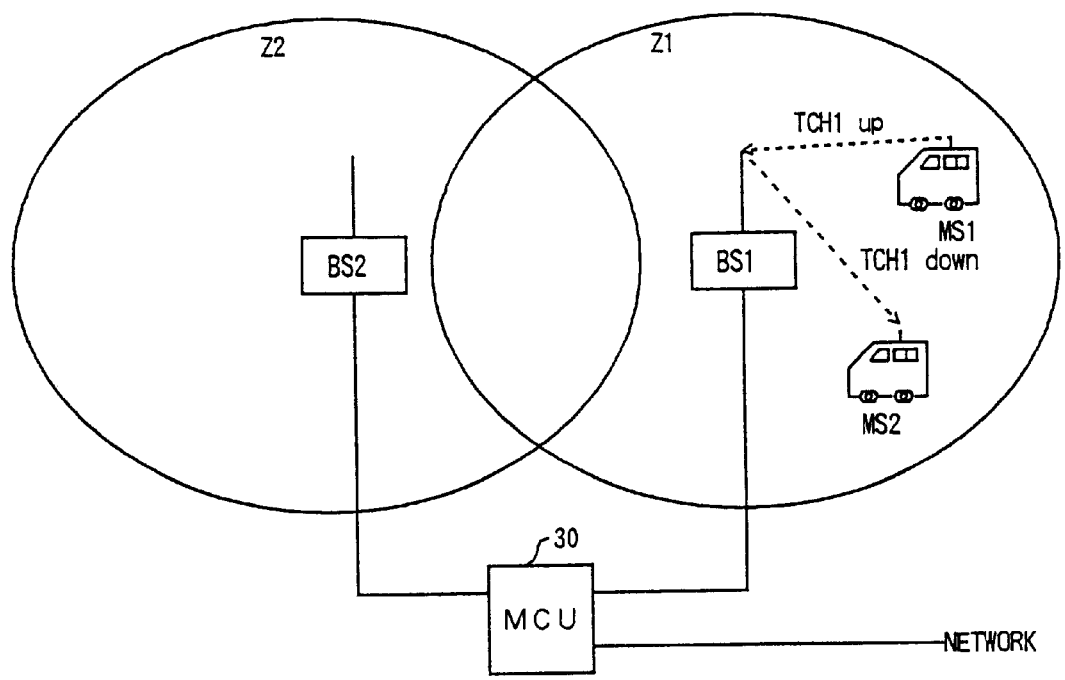
FIGS. 7A and 7B respectively are diagrams for explaining a conventional communication format control method.
Figure 7B:
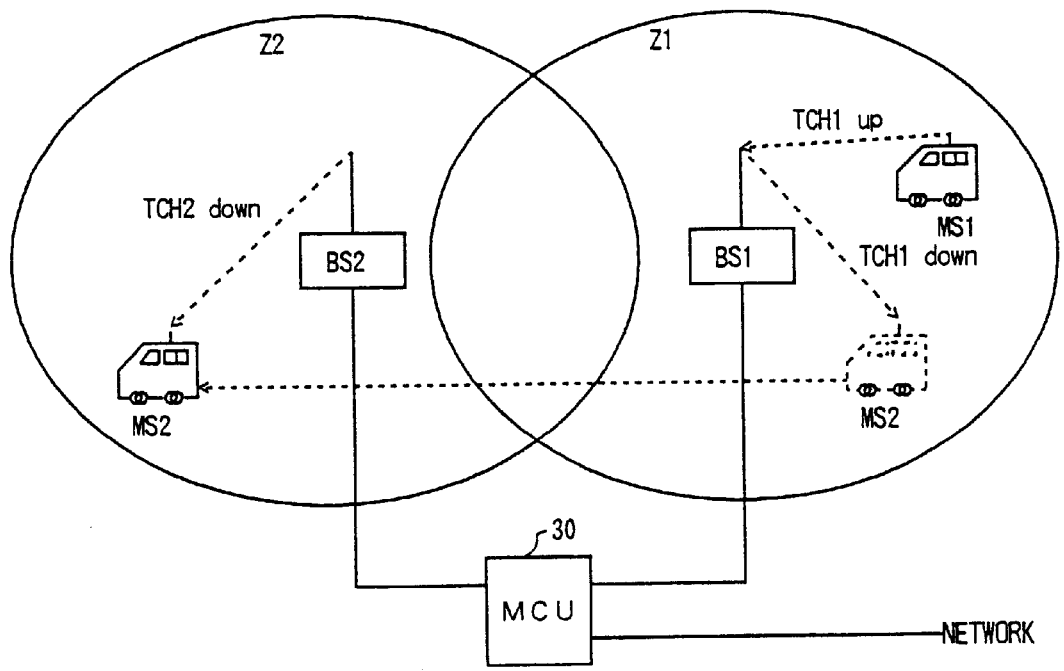
Figure 8A:
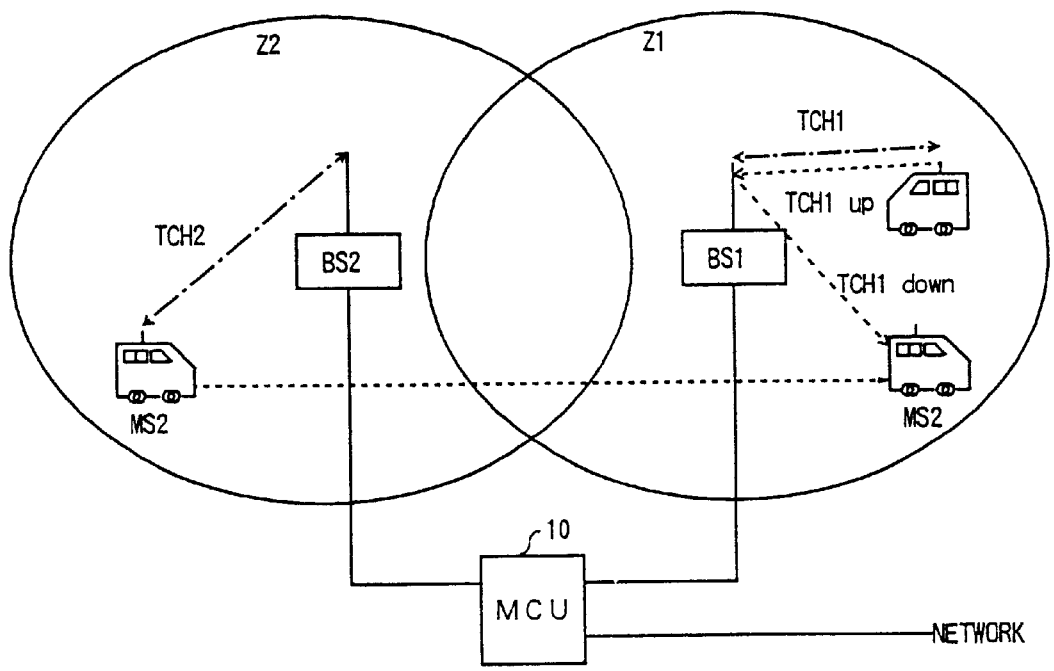
FIGS. 8A and 8B respectively are diagrams for explaining the operating principle of the present invention.
Figure 8B:
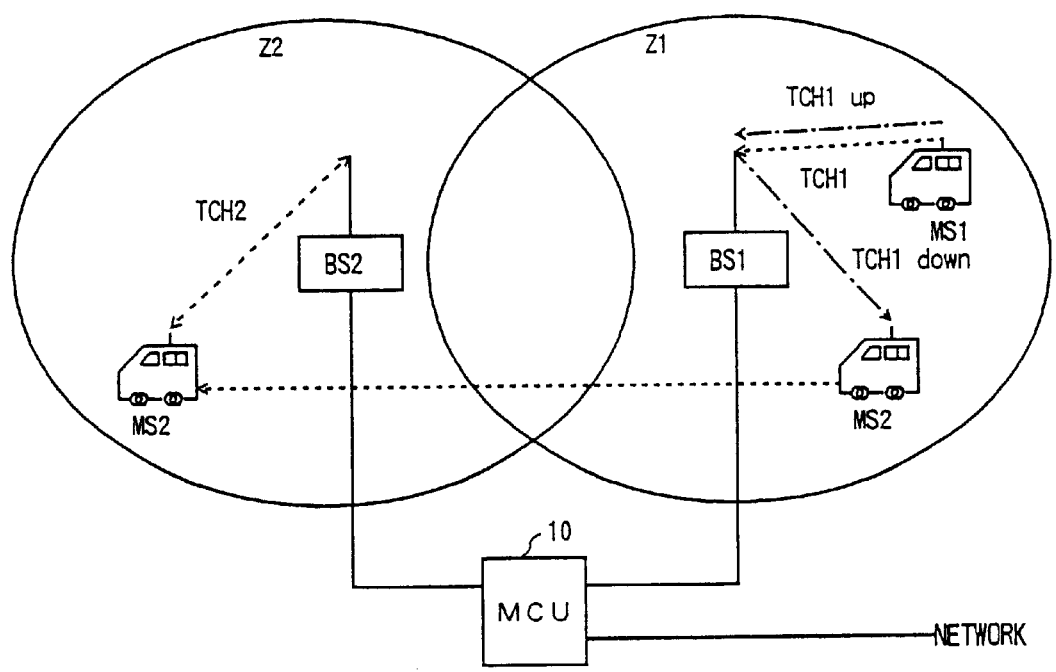

First, a description will be given of a first aspect of the present invention, by referring to FIG. 8A. In FIG. 8A and FIG. 8B which will be described later, those parts which are the same as tho s e corresponding parts in FIGS. 7A and 7B are designated by the same reference numerals, and a description thereof will be omitted.

A communication format control apparatus according to the present invention is use d in a mobile communication system which is capable of providing a communication service to a mobile station in each zone via a plurality of base stations by a simplex or duplex communication format. In a case where a calling mobile station MS1 which calls by a simplex communication request is located in a zone different from a zone in which a called mobile station MS2 is located, the two mobile stations MS1 and MS2 are call-connected by the duplex communication format.

According to this first aspect of the present invention, it is possible to effectively utilize the communication channels which were not utilized conventionally. For example, in the case of the communication from the calling mobile station MS1 and the called mobile station MS2, traffic channels TCH1down and TCH2up are effectively utilized by the present invention. In addition, the mobile stations MS1 and MS2 in this case can communicate by the duplex communication, thereby making it possible to greatly improve the communication service which is originally limited to the simplex communication.

Preferably, according to a second aspect of the present invention, the communication format of the two mobile stations is switched from the duplex communication to the simplex communication when the calling mobile station MS1 or the called mobile station MS2 moves to the same zone as the other party during the duplex communication in the first aspect of the present invention.

As a result, it is possible to effectively utilize the single communication channel (for example, the traffic channel TCH1up or TCH1down) which is allocated for the mobile stations MS1 and MS2 within the same zone.

In addition, according to a third aspect of the present invention, the communication format between the two mobile stations MS1 and MS2 is preferably switched from the simplex communication to the duplex communication when the calling mobile station MS1 or the called mobile station MS2 moves to a zone different from a zone in which the other party is located during the simplex communication in the second aspect of the present invention, as shown in FIG. 8B, for example.

Accordingly, in the case where the mobile stations MS1 and MS2 are located in mutually different zones, each traffic channel (TCHup and TCHdown) respectively allocated for the mobile stations MS1 and MS2 can be utilized effectively.

Furthermore, according to a fourth aspect of the present invention, the communication format of the mobile station in communication is preferably specified by use of a housekeeping channel (RCH) of a down-communication frame in the second or third aspect of the present invention.

Hence, it is possible to effectively change the communication format via the communication channel, without the use of a control channel.

In addition, according to a fifth aspect of the present invention, a communication format control apparatus is used in a mobile communication system which is capable of providing a communication service to a mobile station in each zone via a plurality of base stations by a simplex or duplex communication format, and has a radio line control unit. The radio line control unit includes a position registration table which records a zone in which each mobile station is located, a call state management table which manages a present communication format and a request mode of the communication format at the time when calling or called, for each mobile station, and a communication format controller which instructs the communication format of each mobile station by referring to each of the tables when the mobile station calls or is called or, when the mobile station moves to another zone during communication. The communication format controller instructs the duplex communication format if the request mode when the mobile station calls or is called is the simplex communication and the two mobile stations in communication are located within mutually different zones.

Such a radio line control unit can be realized as a base station control unit, a radio line control station (unit), a mobile switching station (unit) or the like.

According to a sixth aspect of the present invention, the communication format controller instructs the simplex communication format when both the two mobile stations in communication are located within the same zone, in the fifth aspect of the present invention.

In addition, according to a seventh aspect of the present invention, a mobile station unit is used in a mobile communication system which is capable of providing a communication service to the mobile station in each zone via a plurality of base stations by a simplex or duplex communication format. The mobile station unit includes a communication controller which is operable in the simplex and duplex communication formats, a display unit which displays the communication format of the operating mobile station to which the display unit belongs, and a signal sound generator which generates a signal sound to indicate a change to the user when the communication format changes during communication. As a result, the user can appropriately make the intended communication depending on the control of the communication format on the network side.

According to an eighth aspect of the present invention, a press-to-talk button is provided in the mobile station unit so that the mobile station unit can become the speaking side under the simplex communication, in the seventh aspect of the present invention. In this case, the function of the press-to-talk button is locked to an OFF state during operation in the duplex communication format. Thus, the duplex communication is unaffected even if the user operates the press-to-talk button during the duplex communication.

Figure 9:
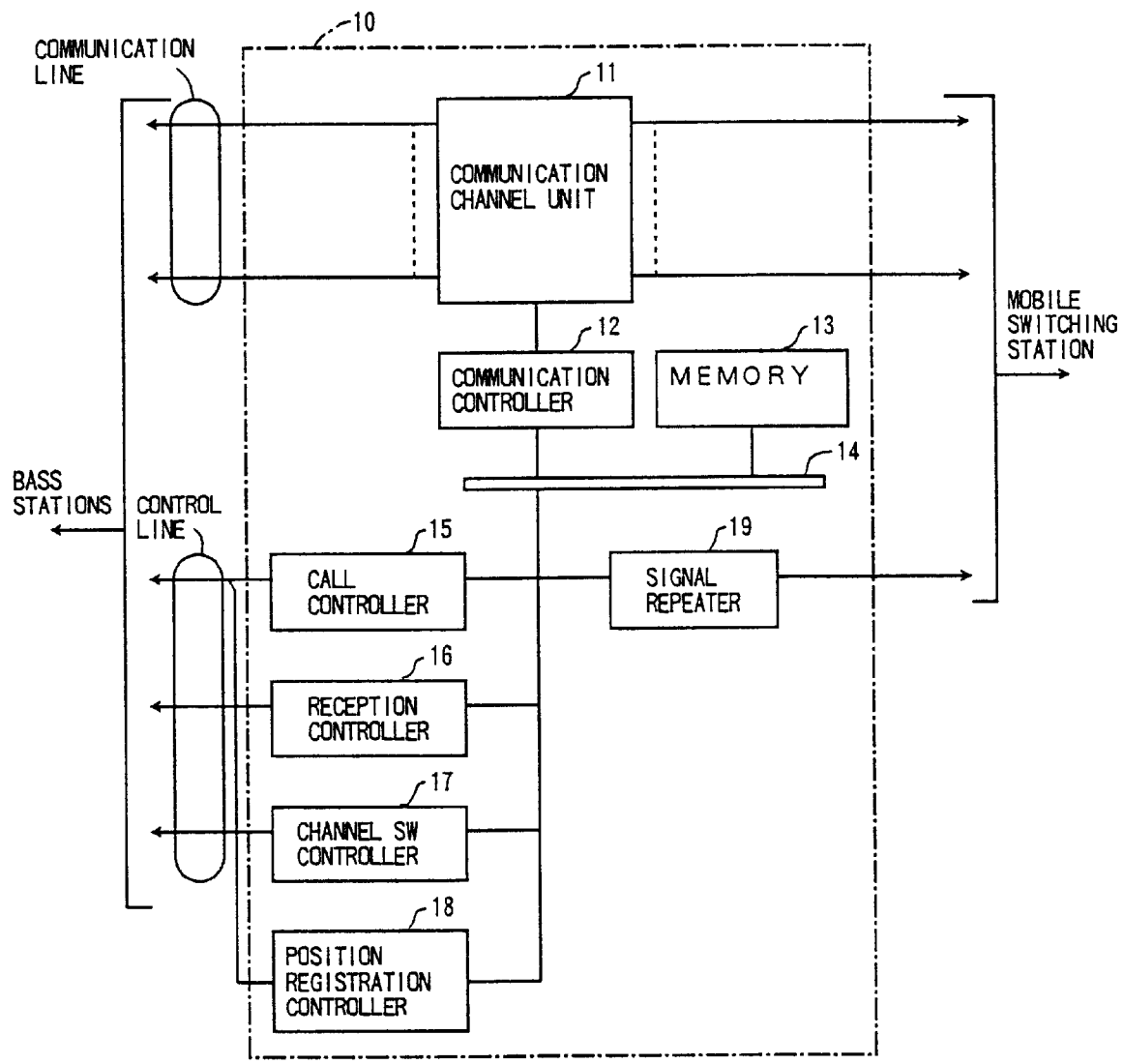
FIG. 9 is a system block diagram showing a radio line control unit of an embodiment of a communication format control apparatus according to the present invention.

Next, a description will be given of an embodiment of the communication format control apparatus according to the present invention, by referring to FIG. 9 and the subsequent drawings. In FIG. 9 and the subsequent drawings, corresponding parts are designated by the same reference numerals.

FIG. 9 is a system block diagram showing a radio line control unit of this embodiment of the communication format control apparatus. A radio line control unit (MCU) 10 is coupled between a plurality of base stations BS (not shown) and a mobile switching station (not shown). The radio line control unit 10 is coupled to the base stations BS via communication lines and control lines. The radio line control unit 10 includes a communication channel unit 11, a communication controller 12, a memory 13, a control signal bus 14, a call controller 15, a reception controller 16, a channel switching controller 17, a position registration controller 18, and a signal repeater 19.

The communication channel unit 11 switches signals of the communication channels. The communication controller 12 controls the communication channel unit 11, and carries out a communication format control process which will be described later in conjunction with FIG. 12. The memory 13 stores various table information and the like which will be described later in conjunction with FIGS. 11A through 11C. The call controller 15 carries out a call control of the mobile station MS, such as accepting the call and specifying of the communication channel, and repeats the necessary signals. The reception controller 16 carries out a reception control of the called mobile station MS, such as selecting the call and specifying the communication channel, and repeats the necessary signals. The channel switching controller 17 controls switching of the communicating channel (that is, handover) of the mobile station MS, and repeats the necessary signals. The position registration controller 18 controls the position registration of the mobile station MS, and repeats the necessary signals. The signal repeater 19 repeats the signals related to the control of each of the controllers described above.

FIG. 10 is a system block diagram showing a digital portable terminal of this embodiment of the communication format control apparatus. This digital portable terminal forms the mobile station MS. The digital portable terminal includes an antenna 31, a transmission and reception branching switch 32, a low-noise amplifier (LNA) for amplifying a radio-frequency (RF) signal, a frequency synthesizer 34, a mixer 35 for converting the RF signal into an intermediate-frequency (IF) signal, a bandpass filter (BPF) 36 for extracting the IF signal in a predetermined frequency band, an IF amplifier (IFA) 37 for amplifying the IF signal to a predetermined level, a demodulator (DEM) 38 which carries out a demodulation using ($\pi/4$) shift quadrature phase shift keying (QPSK), a modulator (MOD) 39 which carries out a modulation using ($\pi/4$) shift QPSK, a transmitter 40, a time division multiple access (TDMA) synchronization controller 41 for carrying out a communication control by TDMA, a codec (CODEC) 42 which carries out a code conversion by coding and decoding, a baseband processor 43 for processing audio signals, a speaker (SPK) 44, and a microphone (MIC) 45 which are coupled as shown in FIG. 10.

In addition, the digital portable terminal further includes a CPU 51 which carries out a main control and call process of the digital portable terminal, a memory (MEM) 52 which stores programs to be executed by the CPU 51 and various necessary data, a console (CSL) 53 provided on a front face of the digital portable terminal, a display unit (DSP) 54 made of a liquid crystal display or the like, light emitting diodes (LEDs) 55 which indicate the simplex communication mode or the duplex communication mode, a keyboard (KBD) 56 which includes dial keys, function keys and the like, a press-to-talk button 57 which is pushed when talking during the simplex communication mode, and a common bus 58 of the CPU 51.

This digital portable terminal has a simplex communication function and a duplex communication function. Depending on the communication format which is instructed by a down-control channel and the communication format which is instructed by a house-keeping bit (RCH) of a down-communication channel, the digital portable terminal switches the communication format thereof from the simplex communication to the duplex communication or vice versa.

When switching the communication format from the simplex communication to the duplex communication, the CPU 51 controls a blue LED 55 which indicates the simplex communication so that the blue LED 55 starts to blink from the ON state and thereafter turns OFF. In addition, the CPU 51 generates a beep sound to indicate the switching of the communication format via the speaker 44 or a buzzer which is not shown. Furthermore, the CPU 51 controls a green LED 55 which indicates the duplex communication to turn ON from the OFF state, and locks the function of the press-to-talk button 57 to the OFF state.

On the other hand, when switching the communication format from the duplex communication to the simplex communication, the CPU 51 controls the green LED 55 which indicates the duplex communication so that the green LED 55 starts to blink from the ON state and thereafter turns OFF. In addition, the CPU 51 generates a beep sound to indicate the switching of the communication format via the speaker 44 or a buzzer which is not shown. Furthermore, the CPU 51 controls the blue LED 55 which indicates the simplex communication to turn ON from the OFF state, and controls the function of the press-to-talk button 57 to a state where the press-to-talk button 57 can be turned ON or OFF.

FIGS. 11A through 11C are diagrams for explaining various tables used in this embodiment of the communication format control apparatus. The tables shown in FIGS. 11A through 11C are stores in the memory 13 shown in FIG. 9.

FIG. 11A shows the contents stored in a position registration table 21. The position registration controller 18 records the position of the mobile station MS in the position registration table 21. In this particular case, mobile stations MS1 through MS3 are located within the same zone Z1, and a mobile station MS4 is located within another zone Z2.

FIG. 11B shows the contents stored in a used state management table 22. When the mobile station MS1 calls, the call controller 15 in response to this call records the used state (calling state) of the mobile station MS1 in the used state management table 22. In addition, the call controller 15 generates a call state management table 26A shown in FIG. 11C, and records a table reference number 26A for this call state management table 26A.

On the other hand, when the mobile station MS2 is called, the reception controller 16 in response to the call records a used state (called state) of the mobile station MS2 in the used state management table 22. Further, the reception controller 16 generates a call state management table 26B shown in FIG. 11C, and records a table reference number 26B for this call state management table 26B.

In this particular case, the used state is "free" with respect to the mobile stations MS3 and MS4 in the used state management table 22 shown in FIG. 11B.

FIG. 11C shows the contents stored in the call state management tables 26A and 26B. In this particular case, it is assumed that the mobile station MS1 called the mobile station MS2. Hence, in the call state management table 26A of the calling mobile station MS1, information such as "calling terminal"=MS1, "called terminal"=MS2, "calling mode (request mode of the communication format when the mobile station MS1 calls)"="simplex communication", "present mode (present communication format)"="initially undefined", and "used communication channel"=TCH1 is recorded. On the other hand, in the call state management table 26B, information such as "calling terminal"=MS1, "called terminal"=MS2, "called mode (request mode of the communication format of the calling mobile station MS1 when the mobile station MS2 is called)"="simplex communication", "present mode (present communication format)"="initially undefined", and "used communication channel"=TCH1 is recorded.

Figure 12:
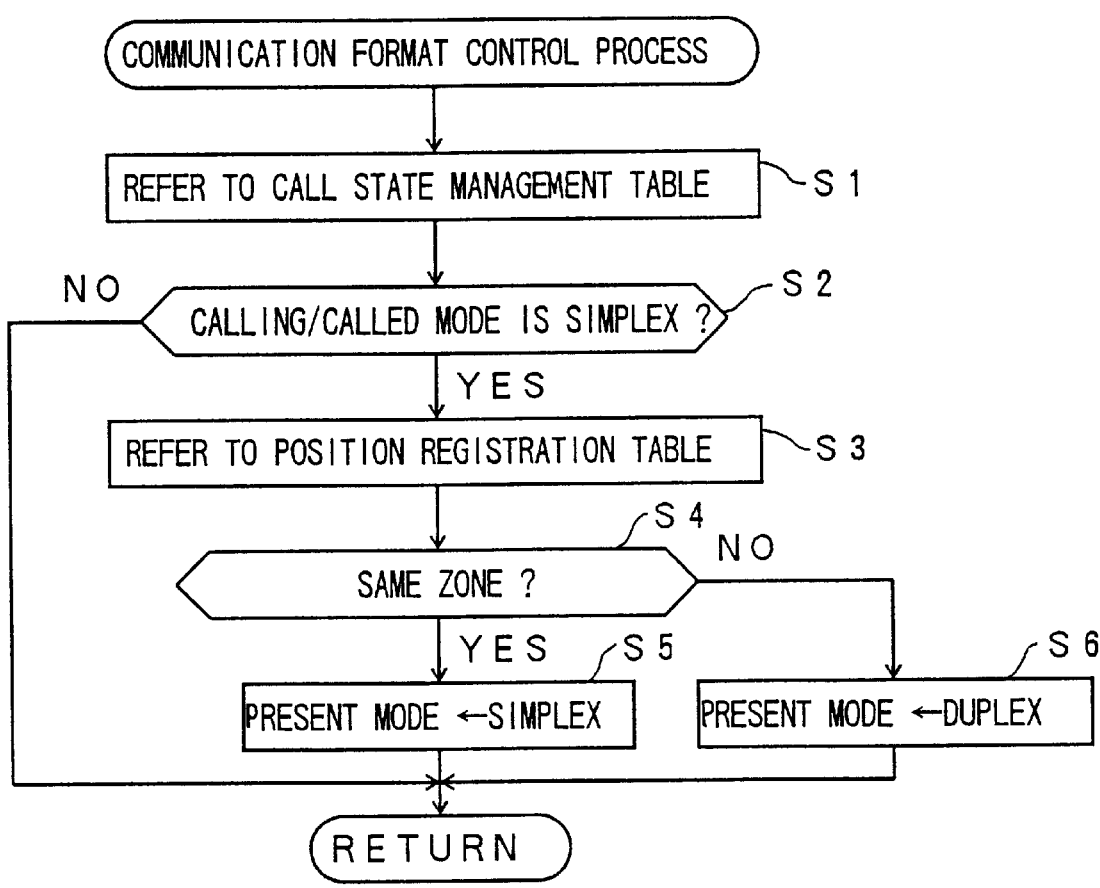
FIG. 12 is a flow chart for explaining a communication format control process of the embodiment of the communication format control apparatus.

FIG. 12 is a flow chart for explaining a communication format control process of this embodiment of the communication format control apparatus. When the mobile station MS calls or is called or, when the mobile station MS moves to another zone during the communication, the communication format control process shown in FIG. 12 is called so that each of the controllers 15 through 17 can judge whether or not it is necessary to switch the communication format.

In FIG. 12, a step S1 makes a reference to the call state management table 26 of the mobile station MS in which an event, such as calling, called, and move to another zone during communication, is generated. A step S2 decides whether the calling or called communication mode of the mobile station MS is the simplex communication. If the decision result in the step S2 is NO, the communication mode is the duplex communication mode, and in this case, the call which is generated by the duplex communication request is serviced to the end by the duplex communication. In other words, the process returns to the main process if the decision result in the step S2 is NO.

On the other hand, if the decision result in the step S2 is YES, a step S3 makes a reference to the position registration table 21. In addition, a step S4 decides whether or not the calling mobile station and the called mobile station are located within the same zone. If the decision result in the step S4 is YES, a step S5 sets the "present mode" of the call state management table 26 to "present mode"="simplex communication", and the process returns to the main process. But if the decision result in the step S4 is NO, a step S6 sets the "present mode" of the call state management table 26 to "present mode"="duplex communication", and the process returns to the main process.

Next, a description will be given of the operation when the mobile station MS1 in the zone Z1 calls the mobile station MS2 in the zone Z1 by the simplex communication request. When the mobile station MS1 calls, the call controller 15 carries out the necessary processes such as generating the call state management table 26A, and calls the communication format control process shown in FIG. 12. Hence, in the step S2, the decision result becomes YES because the "calling (request) mode" of the mobile station MS1 is "simplex communication", and the process advances to the step S3. In the step S4, the "present mode" becomes "present mode"="simplex communication", because the mobile stations MS1 and MS2 are located within the same zone Z1. As a result, the call controller 15 accepts the mobile station MS1 by "present mode"="simplex communication", and allocates the traffic channel TCH1, for example, to the mobile station MS1.

On the other hand, the reception controller 16 which accepts the call to the mobile station MS2 carries out the necessary processes such as generating the call state management table 26B, and calls the communication format control process shown in FIG. 12. Thus, in the step S2, the decision result becomes YES because the "called mode" of the mobile station MS2 (that is, the request mode of the calling mobile station MS1) is "simplex communication", and the process advances to the step S3. In the step S4, the "present mode" becomes "present mode"="simplex communication", because the mobile stations MS1 and MS2 are located within the same zone Z1. As a result, the reception controller 16 processes the mobile station MS2 by "present mode"="simplex communication", and allocates the same traffic channel TCH1 as the mobile station MS1 to the mobile station MS2.

Next, a description will be given of the operation when the mobile station MS2 which is making the simplex communication moves from the zone Z1 to the zone Z2. When the mobile station MS2 moves from the zone Z1 to the zone Z2 during communication, the channel switch controller 17 carries out the necessary processes such as modifying the position registration table 21, and calls the communication format control process shown in FIG. 12. Hence, in the step S2, the decision result becomes YES because the "called mode" of the mobile station MS2 is "simplex communication", and the process advances to the step S3. In the step S4, the "present mode" of the mobile station MS2 is switched to "present mode"="duplex communication", because the mobile stations MS1 and MS2 are located within the mutually different zones Z1 and Z2.

In addition, the channel switch controller 17 captures the "calling terminal"=MS1 from the call state management table 26B of the mobile station MS2, and again calls the communication format control process shown in FIG. 12. Because The "calling mode" of the mobile station MS1 is "calling mode"="simplex communication" in the step S2, the process advances to the step S3. In the step S4, the "present mode" of the mobile station MS1 is switched to "present mode"="duplex communication", because the mobile stations MS1 and MS2 are located within the mutually different zones Z1 and Z2. As a result, the channel switch controller 17 allocates a new traffic channel TCH2, for example, to the mobile station MS2.

Next, a description will be given of the operation when the mobile station MS2 which is making the duplex communication moves from the zone Z2 to the zone Z1. When the mobile station MS2 moves from the zone Z2 to the zone Z1 during communication, the channel switch controller 17 carries out the necessary processes such as modifying the position registration table 21, and calls the communication format control process shown in FIG. 12. Hence, in the step S2, the decision result becomes YES because the "called mode" of the mobile station MS2 is "simplex communication", and the process advances to the step S3. In the step S4, the "present mode" of the mobile station MS2 is switched to "present mode"="simplex communication", because the mobile stations MS1 and MS2 are located within the same zone Z1.

In addition, the channel switch controller 17 captures the "calling terminal"=MS1 from the call state management table 26B of the mobile station MS2, and again calls the communication format control process shown in FIG. 12. Because The "calling mode" of the mobile station MS1 is "calling mode"="simplex communication" in the step S2, the process advances to the step S3. In the step S4, the "present mode" of the mobile station MS1 is switched to "present mode"="simplex communication", because the mobile stations MS1 and MS2 are located within the same zone Z1. As a result, the channel switch controller 17 allocates the same traffic channel TCH1 as the mobile station MS1 to the mobile station MS2.

Next, a description will be given of the operation when the mobile station MS1 in the zone Z1 calls the mobile station MS2 in the zone Z2 by the simplex communication request. When the mobile station MS1 calls, the call controller 15 carries out the necessary processes such as generating the call state management table 26A, and calls the communication format control process shown in FIG. 12. Hence, in the step S2, the decision result becomes YES because the "calling (request) mode" of the mobile station MS1 is "simplex communication", and the process advances to the step S3. In the step S4, the "present mode" becomes "present mode"="duplex communication", because the mobile stations MS1 and MS2 are located within the mutually different zones Z1 and Z2. As a result, the call controller 15 accepts the mobile station MS1 by "present moden"="duplex communication", and allocates the traffic channel TCH1, for example, to the mobile station MS1.

On the other hand, the reception controller 16 which accepts the call to the mobile station MS2 carries out the necessary processes such as generating the call state management table 26B, and calls the communication format control process shown in FIG. 12. Thus, in the step S2, the decision result becomes YES because the "called mode" of the mobile station MS2 is "simplex communication", and the process advances to the step S3. In the step S4, the "present mode" becomes "present mode"="duplex communication", because the mobile stations MS1 and MS2 are located within the mutually different zones Z1 and Z2. As a result, the reception controller 16 processes the mobile station MS2 by "present mode"="duplex communication", and allocates a free traffic channel TCH2 to the mobile station MS2.

Next, a description will be given of the operation when the mobile station MS2 which is making the duplex communication moves from the zone Z2 to the zone Z1. When the mobile station MS2 moves from the zone Z2 to the zone Z1 during communication, the channel switch controller 17 carries out the necessary processes such as modifying the position registration table 21, and calls the communication format control process shown in FIG. 12. Hence, in the step S2, the decision result becomes YES because the "called mode" of the mobile station MS2 is "simplex communication", and the process advances to the step S3. In the step S4, the "present mode" of the mobile station MS2 is switched to "present mode"="simplex communication", because the mobile stations MS1 and MS2 are located within the same zone Z1.

In addition, the channel switch controller 17 captures the "calling terminal"=MS1 from the call state management table 26B of the mobile station MS2, and again calls the communication format control process shown in FIG. 12. Because The "calling mode" of the mobile station MS1 is "calling mode"="simplex communication" in the step S2, the process advances to the step S3. In the step S4, the "present mode" of the mobile station MS1 is switched to "present mode"="simplex communication", because the mobile stations MS1 and MS2 are located within the same zone Z1. As a result, the channel switch controller 17 allocates the same traffic channel TCH1 as the mobile station MS1 to the mobile station MS2.

Next, a description will be given of the operation when the mobile station MS2 which is making the simplex communication moves from the zone Z1 to the zone Z2. When the mobile station MS2 moves from the zone Z1 to the zone Z2 during communication, the channel switch controller 17 carries out the necessary processes such as modifying the position registration table 21, and calls the communication format control process shown in FIG. 12. Hence, in the step S2, the decision result becomes YES because the "called mode" of the mobile station MS2 is "simplex communication", and the process advances to the step S3. In the step S4, the "present mode" of the mobile station MS2 is switched to "present mode"="duplex communication", because the mobile stations MS1 and MS2 are located within the mutually different zones Z1 and Z2.

In addition, the channel switch controller 17 captures the "calling terminal"=MS1 from the call state management table 26B of the mobile station MS2, and again calls the communication format control process shown in FIG. 12.

Because The "calling mode" of the mobile station MS1 is "calling mode"="simplex communication" in the step S2, the process advances to the step S3. In the step S4, the "present mode" of the mobile station MS1 is switched to "present mode"="duplex communication", because the mobile stations MS1 and MS2 are located within the mutually different zones Z1 and Z2. As a result, the channel switch controller 17 allocates a free traffic channel TCH2 to the mobile station MS2.

Figure 13:
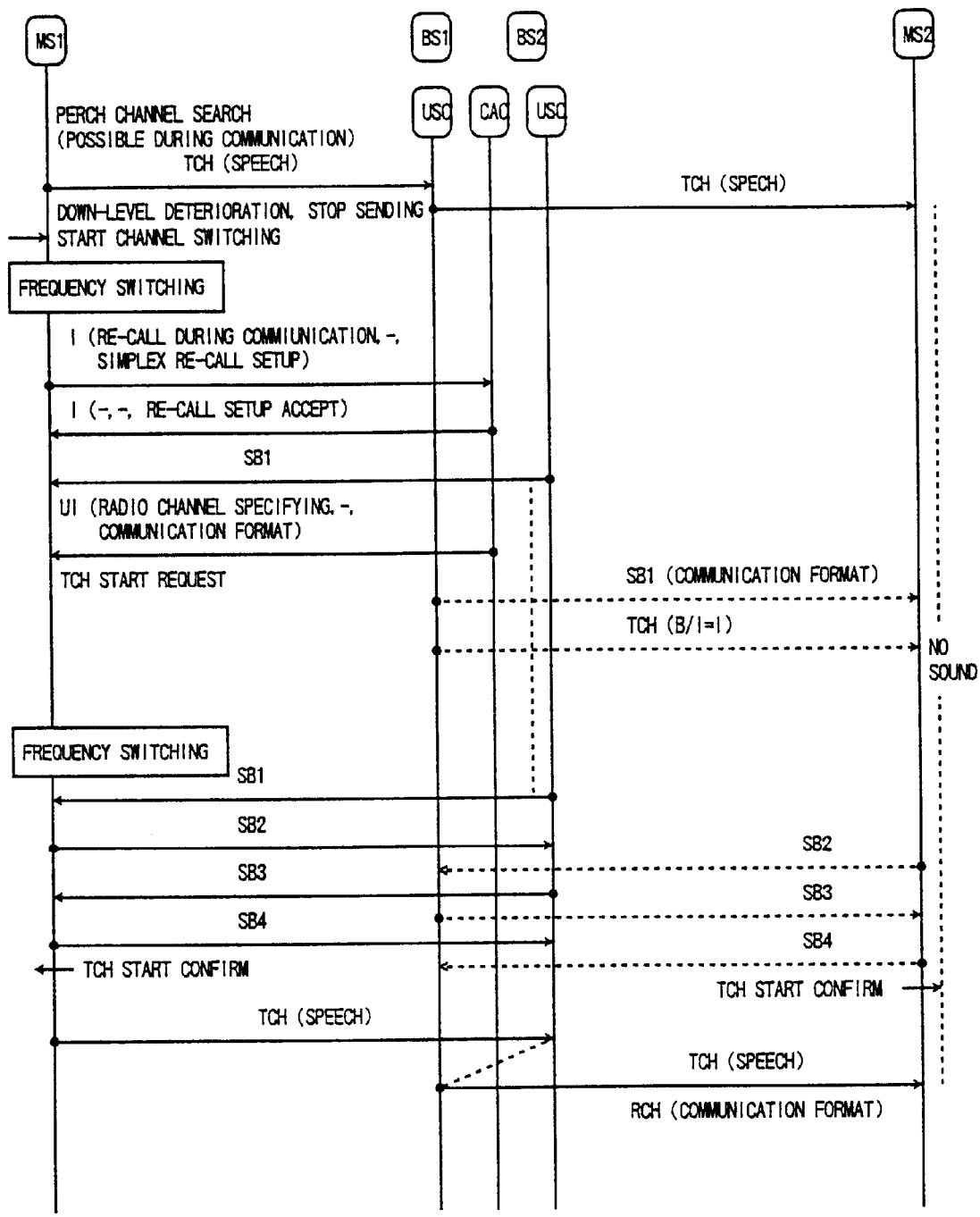
FIG. 13 is a diagram for explaining a simplex-duplex communication channel switching phase of the embodiment of the communication format control apparatus.
Figure 14:
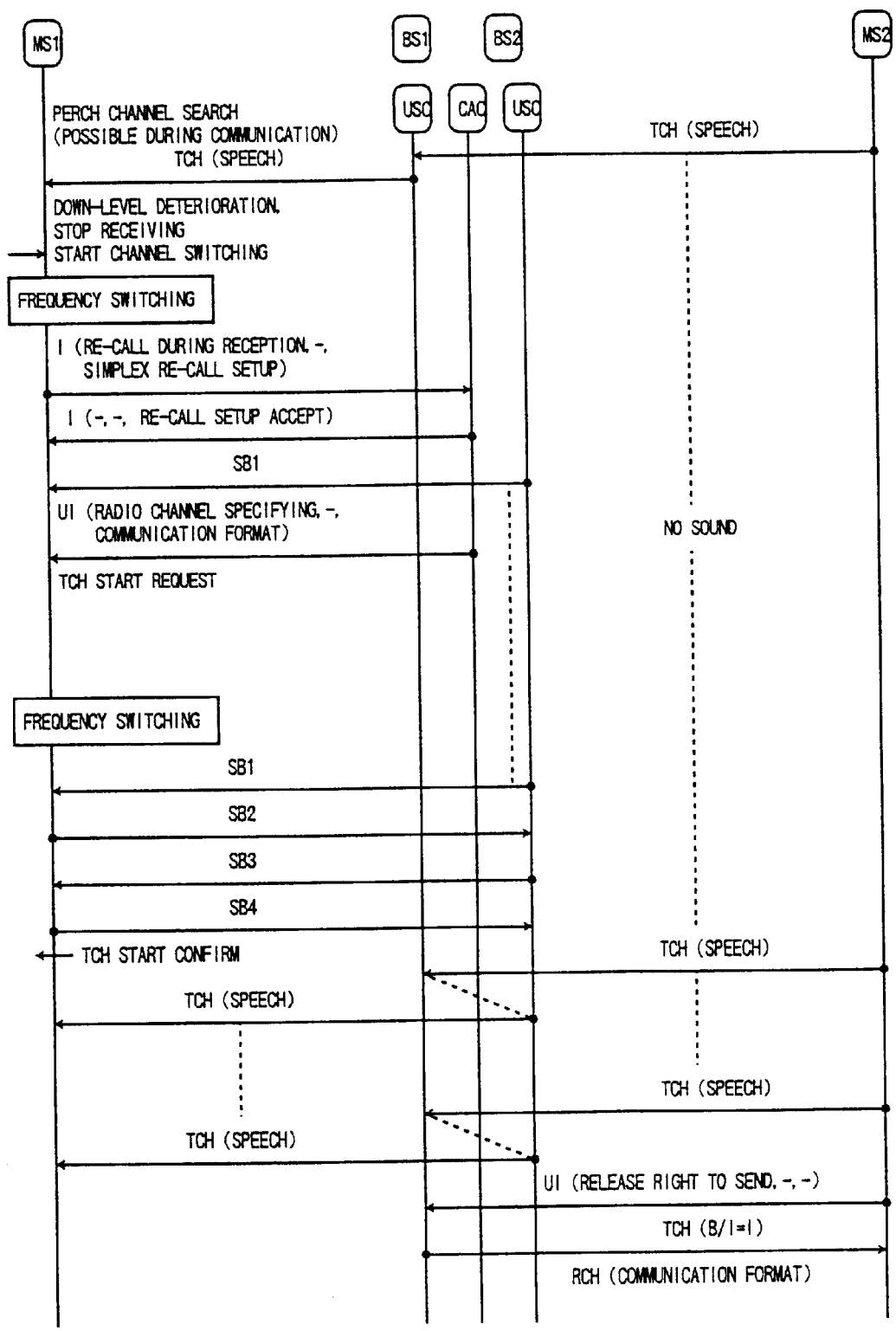
FIG. 14 is a diagram for explaining the simplex-duplex communication channel switching phase of the embodiment of the communication format control apparatus.

FIGS. 13 and 14 respectively are diagrams for explaining a simplex-duplex communication channel switching phase (re-calling type) of this embodiment of the communication format control apparatus. Although the illustration is omitted in FIGS. 13 and 14 for the sake of convenience, the radio line control unit (MCU) 10 is provided between the base stations BS1 and BS2, and the following communicating channel switching control is carried out via the base stations BS1 and BS2.

FIG. 13 shows a case where the mobile station MS1 which is calling the mobile station MS2 via the base station BS1 by simplex communication moves to the zone of the base station BS2. The mobile station MS1 searches for the perch channel based on the deterioration of the down-level, and makes a re-call during communication to the selected base station BS2 by "simplex re-call setup". Responsive to this "simplex re-call setup", the base station BS2, that is, the MCU 10, determines the "present mode" as "present mode"="duplex communication" when the mobile station MS1 moves to a zone different from the zone in which the mobile station MS2 is located, and returns "re-call setup accept" to the mobile station MS1 by the common access channel CAC. In this state, it is also possible to return the "re-call setup accept" by duplex communication. Further, the base station BS2 sends the synchronizing signal SB1 to the mobile station MS1 by the user specific channel USC, and specifies the radio channel by the common access channel CAC. In this state, it is possible to instruct the "communication format" to "communication format"="duplex communication" by the common access channel CAC or the user specific channel USC. Responsive to the specifying of the radio channel, the mobile station MS1 switches the frequency to the specified radio channel, and establishes synchronization with the base station BS2 by exchanging the subsequent synchronizing signals SB1 through SB4. Hence, the traffic channel TCH (speech) from the mobile station MS1 is received by the mobile station MS2 via the base station BS2, the MCU 10 and the base station BS1. Moreover, with respect to the mobile station MS2, it is possible to notify the "communication format"="duplex communication" by the house-keeping channel RCH together with the traffic channel TCH (speech). Consequently, the communication format of the mobile station MS2 is switched to the duplex communication, and establishes the send synchronization between the base station BS1 if necessary.

Alternatively, as indicated by broken lines in FIG. 13, it is possible to specify the radio channel to the mobile station MS1, send the "communication format"="duplex communication" to the mobile station MS2 by the user specific channel USC by including this "communication formats"="duplex communication" in the traffic channel TCH (B/I=I) or the synchronizing signal SB1, and establish the send synchronization between the base station BS1 by exchanging the subsequent synchronizing signals SB2 through SB4. In this case, a duplex communication state is achieved between the mobile stations MS1 and MS2, and the speech of the traffic channel TCH from the mobile station MS1 is continuously received by the mobile station MS2 via the base station BS2, the MCU 10 and the base station BS1.

FIG. 14 shows a case where the mobile station MS1 which is receiving the speech from the mobile station MS2 via the base station BS1 by simplex communication moves to the zone of the base station BS2. The mobile station MS1 searches for the perch channel based on the deterioration of the down-level, and makes a receiving re-call to the selected base station BS2 by "simplex re-call setup". Responsive to this "simplex re-call setup", the base station BS2, that is, the MCU 10, determines the "present mode" as "present mode"="duplex communication" when the mobile station MS1 moves to a zone different from the zone in which the mobile station MS2 is located, and returns "re-call setup accept" to the mobile station MS1 by the common access channel CAC, by duplex communication. Further, the base station BS2 sends the synchronizing signal SB1 to the mobile station MS1 by the user specific channel USC, and specifies the radio channel by the common access channel CAC. In this state, it is possible to instruct the "communication format" to "communication format"="duplex communication" by the common access channel CAC or the user specific channel USC. Responsive to the specifying of the radio channel, the mobile station MS1 switches the frequency to the specified radio channel, and establishes synchronization with the base station BS2 by exchanging the subsequent synchronizing signals SB1 through SB4.

On the other hand, with respect to the mobile station MS2 which is sending, the synchronization is already established between the base station BS1. Hence, the traffic channel TCH (speech) from the mobile station MS2 is continues to be received by the mobile station MS1 via the base station BS1, the MCU 10 and the base station BS2. Moreover, with respect to the mobile station MS2, it is possible to notify the "communication format"="duplex communication" by the user specific channel USC by including this "communication format"="duplex communication" in the traffic channel TCH (B/I=I) and a house keeping channel (radio channel) RCH, when the mobile station MS2 thereafter releases the right to send. Hence, the communication between the mobile stations MS1 and MS2 is switched to the duplex communication.

Figure 15:
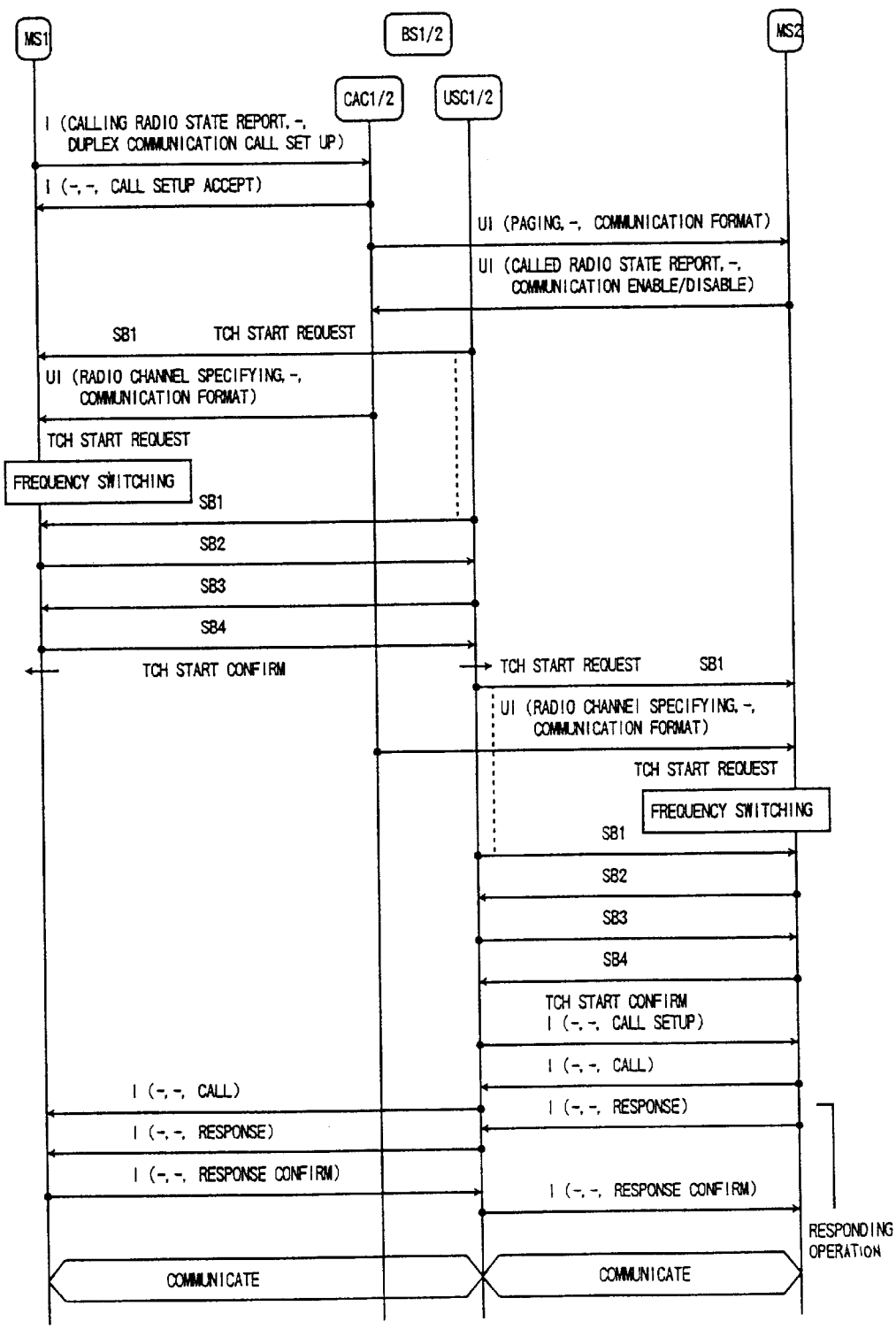
FIG. 15 is a diagram for explaining a communication phase of a simplex communication request-duplex communication of the embodiment of the communication format control apparatus.

FIG. 15 is a diagram for explaining a communication phase of a simplex communication request-duplex communication of this embodiment of the communication format control apparatus. FIG. 15 shows a case where the mobile station MS1 which connects to the base station BS1 calls by a simplex communication request the mobile station MS2 which connects to the base station BS2 of a zone different from that of the base station BS1. When the mobile station MS1 calls the mobile station MS2 by "simplex communication call setup", the base station BS1 (MCU 10) responsive to the "simplex communication call setup" determines the "present mode" as "present mode"="duplex communication" because the mobile stations MS1 and MS2 are located within mutually different zones, and returns "call setup accept" to the mobile station MS1 by duplex communication. In addition, the base station BS1 calls the mobile station MS2 via the base station BS2 by "communication format"="duplex communication". When the mobile station MS2 returns "communication enable" with respect to the call from the base station BS1, the base station BS1 which receives this "communication enable" via the base station BS2 establishes synchronization with the mobile station MS1 by duplex communication. In addition, the base station BS2 establishes synchronization with the mobile station MS2 by duplex communication. When the mobile station MS2 response to the call, the duplex communication state is achieved between the mobile stations MS1 and MS2.

Figure 16:
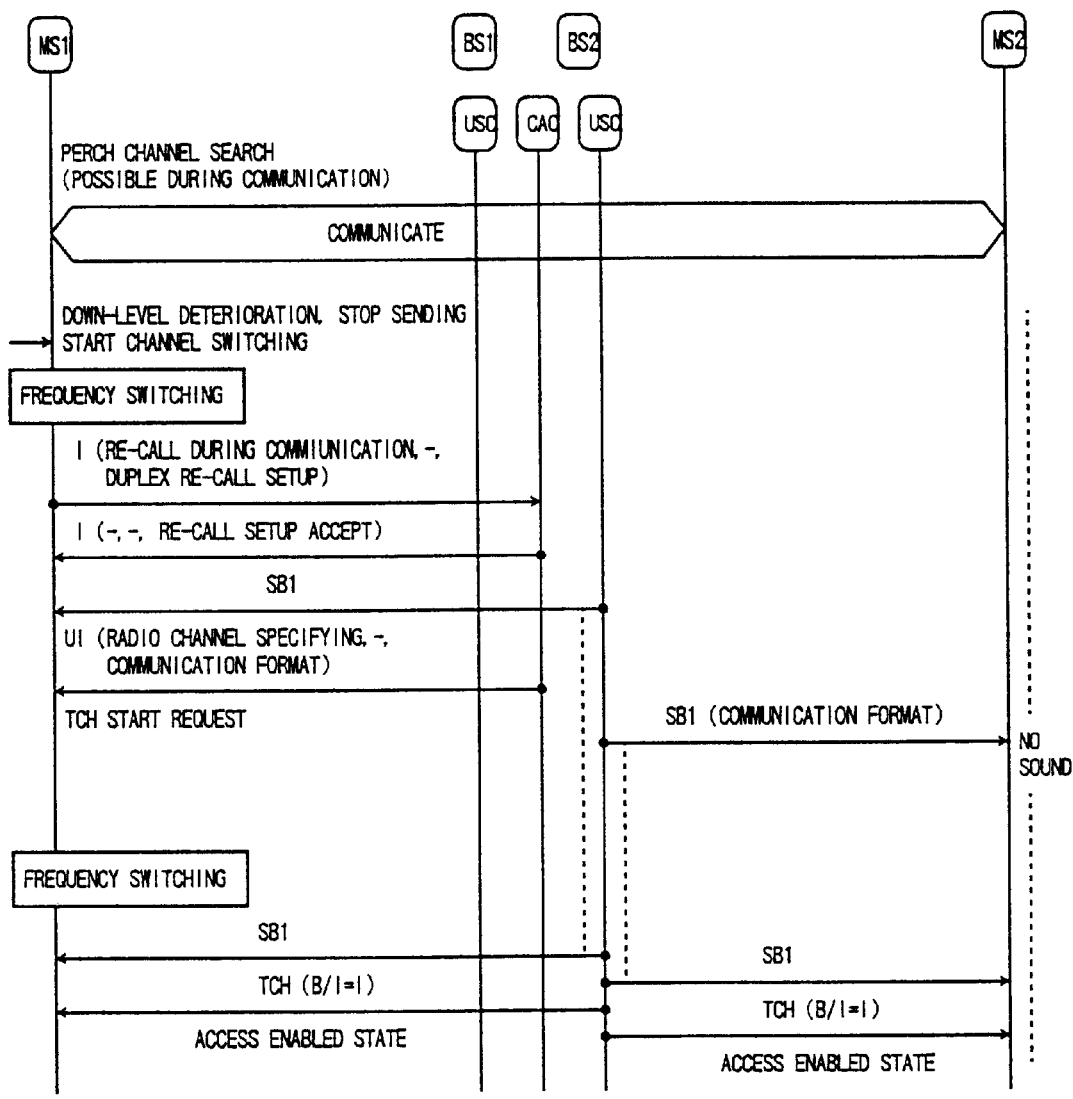
FIG. 16 is a diagram for explaining a duplex communication-simplex communication channel switching phase of the embodiment of the communication format control apparatus.

FIG. 16 is a diagram for explaining a duplex communication-simplex communication channel switching phase of this embodiment of the communication format control apparatus. FIG. 16 shows a case where the mobile station MS1 which is communicating in the "present mode"="duplex communication" as described above moves to the zone in which the mobile station MS2 is located. The mobile station MS1 which connects to the base station BS1 searches for the perch channel by the deterioration of the down-level, and makes a re-call during communication to the selected base station BS2 by "duplex communication re-call setup". The base station BS2 (MCU 10) which receives this "duplex communication re-call setup" determines the "present mode" as "present mode"="simplex communication" when the mobile station MS1 moves to the same zone in which the mobile station MS2 is located, and returns "re-call setup accept" to the mobile station MS1 by the common access channel CAC, by simplex communication. In addition, the base station BS2 sends the synchronizing signal SB1 to the mobile station MS1 for a predetermined time by the user specific channel USC, and specifies the radio channel by the common access channel CAC. In this state, the "communication format" may be set to "communication format"="duplex communication". Responsive to the specifying of the radio channel, the mobile station MS1 switches to the frequency of the specified radio channel, and assumes an access enabled state when the traffic channel TCH (B/I=I) is received from the base station BS2. On the other hand, with respect to the mobile station MS2, the base station BS1 notifies "communication format"="simplex communication" together with the synchronizing signal SB1, and the mobile station MS2 responsive thereto achieves synchronism with the synchronizing signal SB1 if necessary. The mobile station MS2 assumes the access enabled state when the traffic channel TCH (B/I=I) is received from the base station BS1. Thereafter, the mobile stations MS1 and MS2 communicate in the simplex communication mode.

FIGS. 17A, 17B, 18A and 18B respectively are diagrams for explaining a signal format of a radio signal used in this embodiment of the communication format control apparatus.

FIGS. 17A and 17B show the signal format of the physical channel (TCH) for communication in conformance with the standard. More particularly, FIG. 17A shows the signal format of an up-communication frame, and FIG. 17B shows the signal format of a down-communication frame. In FIGS. 17A and 17B, G denotes a guard time, R denotes a guard time for burst excessive response, P denotes a preamble, SW denotes a synchronizing word, CC denotes a color code which is provided as a measure against interference, TCH denotes a traffic channel, FACCH denotes a fast associated control channel (ACCH), SACCH denotes a slow ACCH, RCH denotes a house-keeping channel, B/I denotes busy/idle bits, I denotes idle bits which are constantly "0", and CI denotes control channel communication information.

As may be seen from FIGS. 17A and 17B, the house-keeping bits (RCH) are included in a slot which includes the traffic channel TCH of the up-communication frame and the down-communication frame. The house-keeping bits (RCH) are layer-1 information which is used to transmit in real-time control bits which maintain the radio line and are made up of information such as transmission power control and interference level report.

FIG. 18A shows the RCH information bit structure of the down-communication frame. In FIG. 18A, POW denotes the amount of transmission power control, TA denotes the amount of time alignment (absolute value), and POW-D denotes down-power set value. In this embodiment, "licensee identification signal" which is one signal element of the RCH of the down-communication frame, for example, is used to instruct the change of the communication state of the communication being made from the base station (MCU 10) to the mobile station MS.

FIG. 18B shows the signal format for instructing the communication format. In FIG. 18B, the upper row indicates the signal format of the instruction signal which is used to switch the communication from the simplex communication to the duplex communication, and the lower row indicates the signal format of the instruction signal which is used to switch the communication from the duplex communication to the simplex communication. By sending the instruction signal by the traffic channel TCH of the down-communication frame, it is possible to notify the change in the communication format at any time with respect to the mobile station MS.

In the embodiment described above, the calling and reception control of the mobile station MS, the handover control, and the communication format control of the present invention are realized by the radio line control unit (MCU) 10. However, these control functions may be realized by other apparatuses, such as a base station control unit and a mobile switching station. In addition, these control functions may be distributed among a plurality of apparatuses or units.

In addition, although the present invention is applied to the mobile communication system employing the TDMA in the embodiment described above, the present invention is of course applicable to mobile communication systems employing frequency division multiple access (FDMA) and code division multiple access (CDMA).

Further, the present invention is not limited to these embodiments, but various variations and modifications may be made without departing from the scope of the present invention.

What is claimed is:

1. A communication format control method for a mobile communication system which is capable of providing a communication service to each of a plurality of mobile stations in one or more of a plurality of zones via one or more of a plurality of base stations by a simplex or a duplex communication format, comprising the step of:

call-connecting by a duplex communication format between a calling mobile station which calls by a simplex communication request and a called mobile station, when the calling mobile station is located in a zone different from a zone in which the called mobile station is located.

2. The communication format control method as claimed in claim 1, which further comprises the steps of:

switching the communication format between the calling mobile station and the called mobile station from the duplex communication to the simplex communication when the calling mobile station which is communicating in the duplex communications format moves to the zone in which the called mobile station is located, or when the called mobile station which is communicating in the duplex communication format moves to the zone in which the calling mobile station is located.

3. The communication format control method as claimed in claim 2, which further comprises the steps of:

instructing a communication format with respect to a mobile station which is communicating using a house-keeping channel of a down-communication frame.

4. The communication format control method as claimed in claim 2, which further comprises the steps of:

switching the communication format between the calling mobile station and the called mobile station from the simplex communication to the duplex communication when the calling mobile station which is communicating in the simplex communication format moves to the zone which is different from the zone in which the called mobile station is located or, when the called mobile station which is communicating in the simplex communication format moves to the zone which is different from the zone in which the calling mobile station is located.

5. The communication format control method as claimed in claim 4, which further comprises the steps of:

instructing a communication format with respect to a mobile station which is communicating using a housekeeping channel of a down-communication frame.

6. A communication format control apparatus for a mobile communication system which is capable of providing a communication service to each of a plurality of mobile stations in one or more of a plurality of zones via one or more of a plurality of base stations by a simplex or duplex communication format, comprising a position registration table which records a zone in which each mobile station is located;

a call state management table which manages a present communication format and a request mode of the communication format at a time when calling or called, for each mobile station; and a communication format controller which instructs the communication format of each mobile station by referring to each of said position registration table and said call state management table when a mobile station calls or is called or, when the mobile station moves from one zone to another zone during communication, said communication format controller instructing the duplex communication format for a communication between a first mobile station which calls by a simplex communication request and a second called mobile station in case said first and second mobile stations are located within mutually different zones.

7. The communication format control apparatus as claimed in claim 6, wherein said communication format controller instructs the simplex communication format when both the two mobile stations in communication are located within the same zone.

* * * * *